(12) United States Patent
Tang

(10) Patent No.: US 12,514,480 B2
(45) Date of Patent: Jan. 6, 2026

(54) METHOD FOR ELIMINATING MULTI-CHANNEL GAIN ERRORS OF EEG SIGNAL ACQUISITION SYSTEM

(71) Applicant: ZHEJIANG LAB, Hangzhou (CN)

(72) Inventor: Tao Tang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 804 days.

(21) Appl. No.: 17/874,552

(22) Filed: Jul. 27, 2022

(65) Prior Publication Data

US 2023/0095702 A1 Mar. 30, 2023

(30) Foreign Application Priority Data

Sep. 28, 2021 (CN) .......................... 202111144899.0

(51) Int. Cl.
*A61B 5/31* (2021.01)
(52) U.S. Cl.
CPC ...................... *A61B 5/31* (2021.01)
(58) Field of Classification Search
CPC ................. A61B 5/31; A61B 5/7225
See application file for complete search history.

(56) References Cited

U.S. PATENT DOCUMENTS

| 7,385,443 B1 * | 6/2008 | Denison ............... A61B 5/7225 330/10 |
| 2011/0102228 A1 | 5/2011 | Anthony et al. |
| 2014/0276186 A1 * | 9/2014 | Stanslaski ............. A61B 5/30 600/300 |
| 2016/0249846 A1 * | 9/2016 | Yoo ......................... G16H 50/20 600/544 |

(Continued)

FOREIGN PATENT DOCUMENTS

| CN | 104524692 A | 4/2015 |
| CN | 109546974 A | 3/2019 |

(Continued)

OTHER PUBLICATIONS

J.H. Park et al., "A 15-Ch. 0.019 mm2/Ch. 0.43% gain mismatch orthogonal code chopping instrumentation amplifier SoC for bio-signal acquisition," IEEE Asian Solid-State Circuits Conference, Nov. 4-6, 2019.*

(Continued)

*Primary Examiner* — Alexander Satanovsky
(74) *Attorney, Agent, or Firm* — IPro, PLLC

(57) ABSTRACT

The present application discloses a method for eliminating multi-channel gain errors of an EEG signal acquisition system. The system includes an acquisition electrode, decoupling input capacitors, input units, intra-channel chopper modulators, inter-channel chopper modulators, fully differential closed-loop amplifiers, inter-channel chopper demodulators, intra-channel chopper demodulators, low-pass filters and an output unit sequentially arranged in a signal flow direction of channels. The method includes a process of intra-channel chopping modulation, multi-level inter-channel chopping modulation, amplification, multi-level inter-channel chopping demodulation, intra-channel chopping demodulation, and low-pass filtering. The present application eliminates gain errors between channels, ensures signal acquisition accuracy, and avoids flicker noise in amplifiers.

10 Claims, 2 Drawing Sheets

(56) References Cited

U.S. PATENT DOCUMENTS

2017/0047896 A1  2/2017  Shu et al.

FOREIGN PATENT DOCUMENTS

| CN | 110897612 | * | 3/2020 | ............ | A61B 5/389 |
| CN | 110897612 A | | 3/2020 | | |
| WO | 2015114667 A2 | | 8/2015 | | |
| WO | WO 2015/114667 | * | 8/2015 | ............... | A61B 5/30 |

OTHER PUBLICATIONS

Rongzhu Tao. "Design of Interface Special Integrated Circuit for EEG Signal Measurement." A Dissertation for Master's Degree. Harbin Institute of Technology. Jun. 2020.

\* cited by examiner

METHOD FOR ELIMINATING MULTI-CHANNEL GAIN ERRORS OF EEG SIGNAL ACQUISITION SYSTEM

CROSS REFERENCE TO RELATED APPLICATION

The present application claims the priority to Chinese Patent Application 202111144899.0, titled "METHOD FOR ELIMINATING MULTI-CHANNEL GAIN ERRORS OF EEG SIGNAL ACQUISITION SYSTEM", filed on Sep. 28, 2021, which is incorporated herein by reference in its entirety.

FIELD OF THE INVENTION

The present application relates to the technical field of integrated circuit design, in particular to a method for eliminating multi-channel gain errors of an electroencephalogram (EEG) signal acquisition system.

BACKGROUND OF THE INVENTION

An EEG signal acquisition system generally consists of multiple channels, each channel acquires EEG signals in real-time, and all channels process the acquired EEG signals in parallel. After the steps of amplifying, filtering, and digitizing, the signals of all channels are transmitted to a back end for digital signal processing. Due to the deviations introduced in the design process and production process of an acquisition chip, the acquisition gain of each channel is different, and the gain errors between channels will affect the accuracy of back-end signal processing and calculation. Therefore, the elimination of gain errors between multiple channels is an important technical objective in the EEG signal acquisition system.

At present, the method for eliminating gain errors between channels mostly focuses on gain calibration between two channels, and the gain error is compensated on the acquisition gain of a certain channel by means of feedback. However, this method consumes a lot of hardware resources and has the disadvantage that it cannot be quickly extended to multi-channel gain calibration.

SUMMARY OF THE INVENTION

The objective of the present application is to provide a method for eliminating multi-channel gain errors of an EEG signal acquisition system, in which acquired signals are first carried to an identical chopping frequency by chopping modulation circuits in channels, and then the EEG signals of different channels are subjected to inter-channel chopping modulation, so that the EEG signal of each channel obtains the same amplification gain (the gain is an average gain of all channels), thereby reducing inter-channel gain errors. Aiming at the multi-channel acquisition system, the patent of the present application proposes a method for eliminating gain errors between channels based on hybrid chopping technology, which dynamically averages acquisition gains of channels, has the technical advantages of low hardware resource consumption, scalable number of channels, and small inter-channel gain errors, and achieves the objective of high-precision, multi-channel, and low-error EEG signal acquisition.

The technical solution adopted in the present application is as follows: A method for eliminating multi-channel gain errors of an EEG signal acquisition system, the multi-channel acquisition system including an acquisition electrode, decoupling input capacitors, input units, intra-channel chopper modulators, inter-channel chopper modulators, fully differential closed-loop amplifiers, inter-channel chopper demodulators, intra-channel chopper demodulators, low-pass filters and an output unit sequentially arranged in a signal flow direction of channels, including the following steps:

S1: acquiring EEG signals by the acquisition electrode, wherein the acquired EEG signals are transmitted to the input units by the decoupling input capacitors, and the acquired EEG signal is input by each input unit into the intra-channel chopper modulator to obtain an intra-channel chopping modulated EEG signal and an intra-channel chopping modulation frequency;

S2: performing first-level inter-channel chopping modulation on the intra-channel chopping modulated EEG signals in every two channels as a group to obtain first-level inter-channel chopping modulated EEG signals, wherein the frequency of first-level inter-channel chopping modulation is half of the intra-channel chopping modulation frequency; performing second-level inter-channel chopping modulation on the first-level inter-channel chopping modulated EEG signals in every two adjacent groups as a new big group by means of first-level inter-channel chopping modulation control signals; and so on, wherein the chopping frequency of each level of inter-channel chopping modulation is reduced to half of the previous one, corresponding inter-channel chopping modulated EEG signals are output after each level of inter-channel chopping modulation, until the inter-channel chopping modulation of all channels is completed in the last level, and multi-level chopping modulated EEG signals are finally obtained;

S3: amplifying the multi-level chopping modulated EEG signals by the fully differential closed-loop amplifier in the signal flow direction of each channel, to obtain amplified multi-level chopping modulated EEG signals;

S4: performing inter-channel chopping demodulation on the amplified multi-level chopping modulated EEG signals by means of the same architecture as step S2 but in an invert timing to obtain multi-level inter-channel chopping demodulated EEG signals; performing intra-channel chopping demodulation on the multi-level inter-channel chopping demodulated EEG signals to obtain intra-channel chopping demodulated EEG signals; and S5: transmitting the intra-channel chopping demodulated EEG signals to the low-pass filter in the signal flow direction of each channel, and filtering high-frequency modulation noise out by the low-pass filter to retain the signal content of the original EEG signals.

Further, the acquisition electrode includes a working electrode and a reference electrode. The positive terminal of each channel is connected to the reference electrode to acquire an EEG signal of a reference EEG reference voltage $V_{REF}$, the negative terminal is connected to the working electrode to acquire an EEG signal of a working EEG reference voltage $V_{EEC}$, and the EEG signals of the positive terminal and the negative terminal are subjected to chopping modulation by the channel chopper unit, and amplified by the fully differential closed-loop amplifier to obtain amplified multi-level chopping modulated EEG signals of reference voltage $V_{REF}$ and $V_{EEC}$.

Further, in step S2, the expression of the inter-channel chopping modulation control signals $V_{gcN}(t)$ in time domain is:

$$V_{gcN}(t) = \frac{4}{\pi} \sum_{k=1,3,5\ldots}^{\infty} \frac{\sin\left(k\left(\frac{\omega_{gchop}}{2^{N-1}}\right)t\right)}{k},$$

where k is an odd number, which represents odd harmonics generated by the chopping modulation, $$\frac{\omega_{gchop}}{2^{N-1}}$$

is an angular frequency of the N-th-level inter-channel chopping modulation, $\omega_{gchop}=2\pi f_{gchop}$, and $f_{gchop}$ is the chopping frequency of the first-level inter-channel chopping modulation, $$V_m(t) = V_n(t)\frac{4}{\pi} \sum_{k=1,3,5\ldots}^{\infty} \frac{\sin\left(k\left(\frac{\omega_{gchop}}{2^{N-1}}\right)t\right)}{k},$$

where $V_n(t)$ is the EEG signal of the n-th channel before the N-th-level inter-channel chopping modulation, and $V_m(t)$ is the EEG signal after the N-th-level inter-channel chopping modulation, for multi-level inter-channel chopping modulation, from the perspective of a single channel, the expression of the inter-channel chopping modulation control signal is:

$$s(t) = \sum_{m=0}^{+\infty} \Pi\left(\frac{t-mT-n\lambda}{\lambda} + \frac{1}{2}\right),$$

where T is a modulation period, f=1/T, f is a modulation frequency, that is, a chopping frequency of inter-channel chopping modulation, λ is a pulse width of the inter-channel chopping modulation control signal, λ=T/N, n represents the n-th channel, N represents the N-level inter-channel chopping modulation. Π(t) is a rectangular wave signal and its function expression is:

$$\Pi(t) = \begin{cases} 1, & \text{if } |t| < 0.5 \\ 0.5, & \text{if } |t| = 0.5, \\ 0, & \text{if } |t| > 0.5 \end{cases}$$

the inter-channel chopping modulation control signal of each level maintains the same amplitude and phase.

Further, the multi-level inter-channel chopping demodulated EEG signals in step S4 are:

$$V_{demodN}(t) = \frac{\sum_{i=1}^{N} A_i}{N} v_i(t)\left[\prod_{m=1}^{N} v_{gcm}(t)\right]^2 = \frac{\sum_{i=1}^{N} A_i}{N} v_i(t)\prod_{m=1}^{N} H_m,$$

where $A_i$ is the gain of the i-th channel, $V_{gem}(t)$ is an inter-channel chopping demodulation control signal, which is identical to the inter-channel chopping modulation control signal, and the harmonic parameter $H_m$ is:

$$H_m = \sum_{k=1,3,5\ldots}^{\infty} \left(\frac{4}{k\pi}\right)\sin\left(k\left(\frac{\omega_{gchop}}{2^{m-1}}\right)t\right) * \sum_{p=1,3,5\ldots}^{\infty} \left(\frac{4}{p\pi}\right)\sin\left(p\left(\frac{\omega_{gchop}}{2^{m-1}}\right)t\right),$$

where k and p are odd numbers, and m represents the m-th level of N levels of inter-channel chopping demodulation.

Further, the equivalent amplification gain of each channel is:

$$A_{gi} = \frac{1}{i}\sum_{i=1,2,3\ldots}^{i} A_i,$$

where $A_i$ is the gain of the i-th channel, i is greater than or equal to 2, and i is the N-th power of 2.

Further, regarding the inter-channel chopping demodulation in step S4, after a N levels of inter-channel chopping demodulation, the signal of each channel returns to the output end of each channel and then is subject to the intra-channel chopper demodulation. The signal carried to the chopping frequency returns to its original frequency band. Intra-channel chopping modulation control signals and intra-channel chopping demodulation control signals are synchronization signals, that is, the intra-channel chopping modulation and intra-channel chopping demodulation processes in each channel are controlled by the same clock signal generated by an external crystal oscillator.

Further, the low-pass filter has a cut-off frequency of 200 Hz and implements filtering by means of a switching capacitor, and the switching capacitor has an operating frequency of 32 kHz.

Further, the method includes non-overlapping setting of rising edges or falling edges of the control signals: the multi-level inter-channel chopping modulation control signals and intra-channel chopping modulation control signals are generated by the same clock signal, and different clock rising edges or falling edges are maintained, wherein the difference between the rising edges or falling edges of different control signals is greater than or equal to 20 ps, and the crosstalk between channels is less than or equal to −70 dB.

Further, the fully differential closed-loop amplifier has a gain of 60 dB, an input capacitance of 20 pF, and a feedback capacitance of 0.2 pF.

Further, the magnitude of the decoupling input capacitor is 300 nF.

The present application has the following beneficial effects: acquired signals are first carried to an identical chopping frequency by internal chopper circuits, and then the EEG signals of different channels are subject to inter-channel chopping, so that the EEG signal of each channel obtains the same amplification gain (the gain is an average gain of all channels), thereby reducing inter-channel gain errors.

DETAILED DESCRIPTION OF THE EMBODIMENTS

The following description of at least one exemplary embodiment is actually only illustrative, and serves by no means as any limitation to the present application and application or usage thereof. All other embodiments obtained by those of ordinary skill in the art based on the embodiments of the present disclosure without any creative effort shall fall within the protection scope of the present application.

Figure 1:
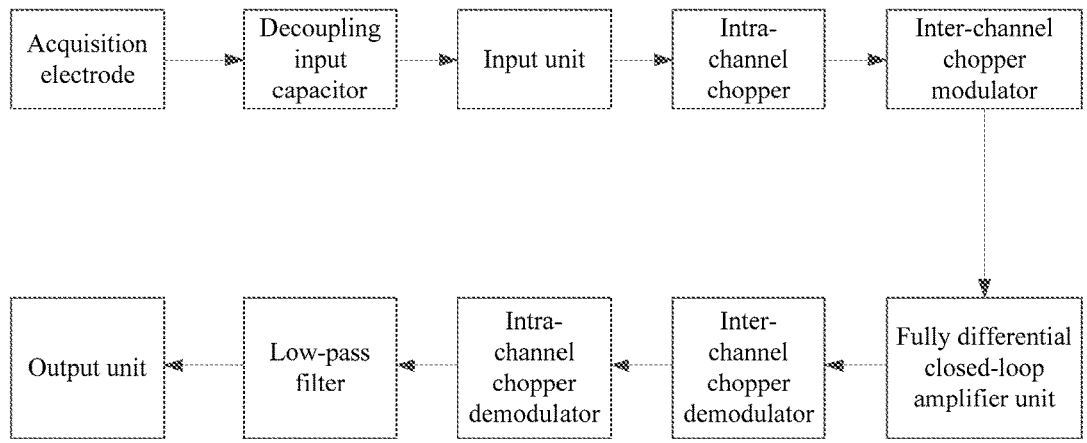
FIG. 1 is a schematic flowchart of the present application.

With reference to FIG. 1, a method for eliminating multi-channel gain errors of an EEG signal acquisition system, the multi-channel acquisition system including an acquisition electrode, decoupling input capacitors, input units, intra-channel chopper modulators, inter-channel chopper modulators, fully differential closed-loop amplifiers, inter-channel chopper demodulators, intra-channel chopper demodulators, low-pass filters and an output unit sequentially arranged in a signal flow direction of channels, includes the following steps:
- S1: acquiring EEG signals by the acquisition electrode, wherein the acquired EEG signals are transmitted to the input units by the decoupling capacitors, and the decoupled EEG signal are input into the intra-channel chopper modulator by each input unit to obtain an intra-channel chopping modulated EEG signal and an intra-channel chopping modulation frequency;
- S2: performing first-level inter-channel chopping modulation on the intra-channel chopping modulated EEG signals in every two channels as a group to obtain first-level inter-channel chopping modulated EEG signals, the frequency of first-level inter-channel chopping modulation being half of the intra-channel chopping modulation frequency; performing second-level inter-channel chopping modulation on the first-level inter-channel chopping modulated EEG signals in every two adjacent groups as a new big group by means of inter-channel chopping modulation control signals; and so on, wherein the chopping frequency of each level of inter-channel chopping modulation is reduced to half of the previous one, corresponding inter-channel chopping modulated EEG signals are output after each level of inter-channel chopping modulation, until the inter-channel chopping modulation of all channels is completed in the last level, and multi-level chopping modulated EEG signals are finally obtained;
- S3: amplifying the multi-level chopping modulated EEG signals by the fully differential closed-loop amplifier in the signal flow direction of each channel, to obtain amplified multi-level chopping modulated EEG signals;
- S4: performing inter-channel chopping demodulation on the amplified multi-level chopping modulated EEG signals by means of the same architecture as step S2 but in an invert timing to obtain multi-level inter-channel chopping demodulated EEG signals, and performing intra-channel chopping demodulation on the multi-level inter-channel chopping demodulated EEG signals to obtain intra-channel chopping demodulated EEG signals; and
- S5: transmitting the intra-channel chopping demodulated EEG signals to the low-pass filter in the signal flow direction of each channel, and filtering high-frequency modulation noise out by the low-pass filter to retain the signal content of the original EEG signals.

Further, the acquisition electrode includes a working electrode and a reference electrode, the positive terminal of each channel is connected to the reference electrode to acquire a reference EEG signal $V_{REF}$, the negative terminal is connected to the working electrode to acquire a working EEG signal $V_{EEC}$. The EEG signals of the positive terminal and the negative terminal are subject to chopping modulation by the intra-channel chopper modulators and inter-channel chopper modulators, and amplified by the fully differential closed-loop amplifier to obtain amplified multi-level chopping modulated EEG signals.

Further, in step S2, the expression of the inter-channel chopping modulation control signals $V_{gcN}(t)$ in time domain is:

$$V_{gcN}(t) = \frac{4}{\pi}\sum_{k=1,3,5\ldots}^{\infty}\frac{\sin\left(k\left(\frac{\omega_{gchop}}{2^{N-1}}\right)t\right)}{k},$$

where k is an odd number, which represents odd harmonics generated by the chopping modulation, $$\frac{\omega_{gchop}}{2^{N-1}}$$

is an angular frequency or the N-th-level inter-channel chopping modulation, $\omega_{gchop}=2\pi f_{gchop}$, and $f_{gchop}$ is the chopping frequency of the first-level inter-channel chopping modulation, $$V_m(t) = V_n(t)\frac{4}{\pi}\sum_{k=1,3,5\ldots}^{\infty}\frac{\sin\left(k\left(\frac{\omega_{gchop}}{2^{N-1}}\right)t\right)}{k},$$

where $V_n(t)$ is the EEG signal of the n-th channel before the N-th-level inter-channel chopping modulation, and $V_m(t)$ is the EEG signal after the N-th-level inter-channel chopping modulation, for multi-level inter-channel chopping modulation, from the perspective of a single channel, the expression of the inter-channel chopping modulation control signal is:

$$s(t) = \sum_{m=0}^{+\infty}\Pi\left(\frac{t-mT-n\lambda}{\lambda}+\frac{1}{2}\right),$$

where T is a modulation period, f=1/T, f is a modulation frequency, that is, a chopping frequency of inter-channel chopping modulation, λ is a pulse width of the inter-channel chopping modulation control signal, λ=T/N, n represents the n-th channel, N represents the N-th-level inter-channel chopping modulation, Π(t) is a rectangular wave signal and its function expression is:

$$\Pi(t) = \begin{cases} 1, & \text{if } |t| < 0.5 \\ 0.5, & \text{if } |t| = 0.5, \\ 0, & \text{if } |t| > 0.5 \end{cases}$$

the inter-channel chopping modulation control signal of each level maintains the same amplitude and phase.

Further, the multi-level inter-channel chopping demodulated EEG signals in step S4 are:

$$V_{demodN}(t) = \frac{\sum_{i=1}^{N} A_i}{N} v_i(t) \left[ \prod_{m=1}^{N} v_{gcm}(t) \right]^2 = \frac{\sum_{i=1}^{N} A_i}{N} v_i(t) \prod_{m=1}^{N} H_m,$$

where $A_i$ is the gain of the i-th channel, $V_{gem}(t)$ is an inter-channel chopping demodulation control signal, which is identical to the inter-channel chopping modulation control signal $V_{gcN}(t)$, and the harmonic parameter $H_m$ is:

$$H_m = \sum_{k=1,3,5...}^{\infty} \left(\frac{4}{k\pi}\right) \sin\left(k\left(\frac{\omega_{gchop}}{2^{m-1}}\right)t\right) * \sum_{p=1,3,5...}^{\infty} \left(\frac{4}{p\pi}\right) \sin\left(p\left(\frac{\omega_{gchop}}{2^{m-1}}\right)t\right),$$

where k and p are odd numbers, and m represents the m-th level of N levels of inter-channel chopping demodulation.

Further, the equivalent amplification gain of each channel is:

$$A_{gi} = \frac{1}{i} \sum_{i=1,2,3...}^{i} A_i,$$

where $A_i$ is the gain of the i-th channel, i is greater than or equal to 2, and i is the N-th power of 2.

Further, regarding the inter-channel chopping demodulation in step S4, after the N levels of inter-channel chopping demodulation, the signal of each channel returns to the output end of each channel and then passes through the intra-channel chopper demodulator, and the signal carried to the chopping frequency returns to its original frequency band. Intra-channel chopping modulation control signals and intra-channel chopping demodulation control signals are synchronous signals, that is, the intra-channel chopping modulation process and intra-channel chopping demodulation process in each channel are controlled by the same clock signal generated by an external crystal oscillator.

Further, the low-pass filter has a cut-off frequency of 200 Hz and implements filtering by means of a switching capacitor; the switching capacitor has an operating frequency of 32 kHz.

Further, the method includes non-overlapping setting of rising edges or falling edges of the control signals: the multi-level inter-channel chopping modulation control signals and intra-channel chopping modulation control signals are generated by the same clock signal, and different clock rising edges or falling edges are maintained, wherein the difference between the rising edges or falling edges of different control signals is greater than or equal to 20 ps, and the crosstalk between channels is less than or equal to −70 dB.

Further, the fully differential closed-loop amplifier has a gain of 60 dB, an input capacitance of 20 pF, and a feedback capacitance of 0.2 pF.

Further, the magnitude of the decoupling input capacitor is 300 nF.

Figure 2:
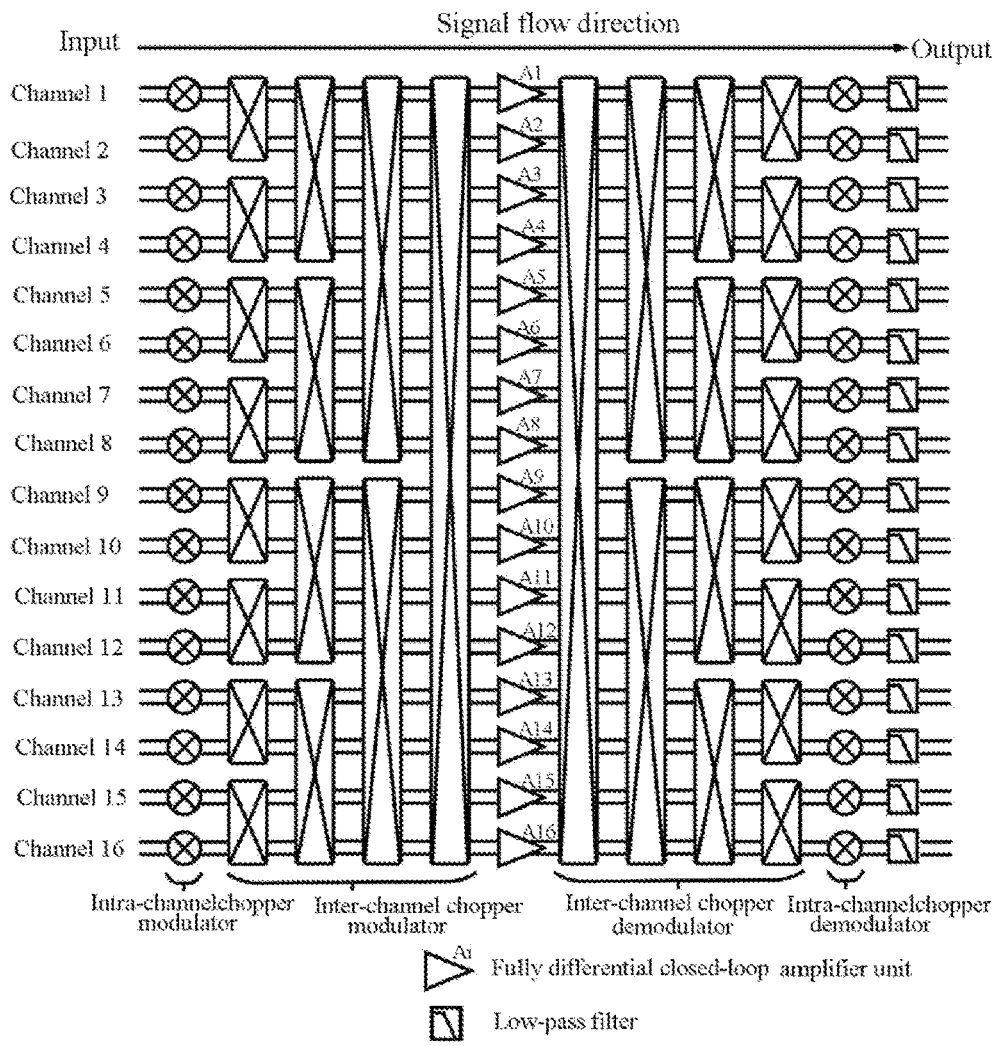
FIG. 2 is a schematic diagram of Embodiment 1 of the present application.
Figure 3:
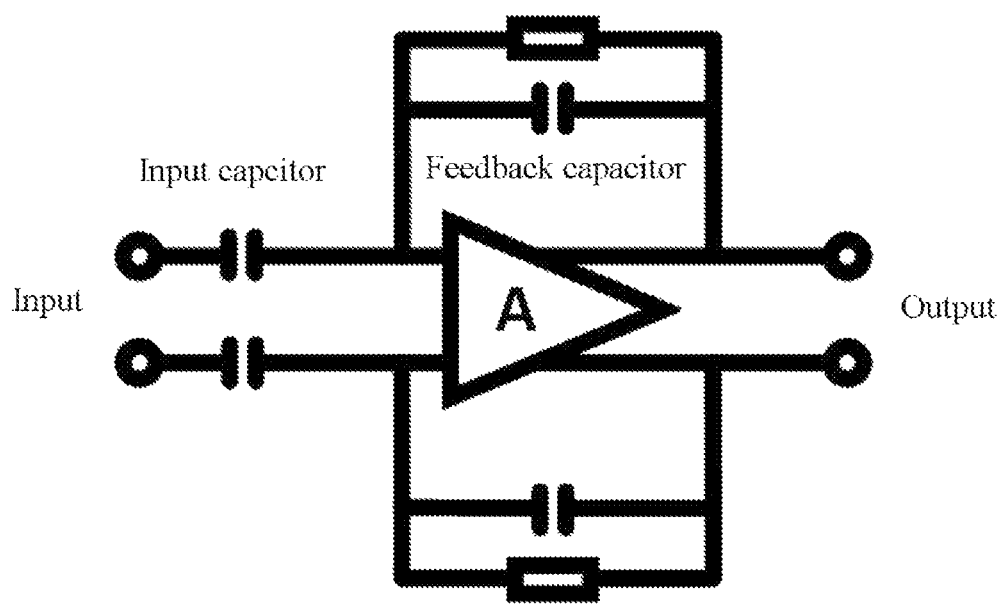
FIG. 3 is a schematic diagram of a precision instrument amplifier according to Embodiment 1 of the present application.

Embodiment 1: as shown in FIG. 2 and FIG. 3, a 16-channel EEG signal acquisition system is taken as an example for illustration:

S1: EEG signals from 16 acquisition nodes are acquired by the acquisition electrode, and the acquired EEG signals are transmitted to the input units by the decoupling input capacitors. At the input end of each channel, each input unit inputs the acquired EEG signal into the intra-channel chopper modulator to obtain an intra-channel chopping modulated EEG signal and a chopping frequency of $f_c$. In the 16-channel EEG signal multi-channel acquisition system, a lead method of sharing a reference electrode is used, wherein the positive terminal of each channel is connected to the reference electrode to acquire an EEG signal of a reference EEG reference voltage $V_{REF}$, the negative terminal is connected to the working electrode to acquire an EEG signal of a working EEG reference voltage $V_{EEC}$, and the EEG signals of the positive terminal and the negative terminal are subject to chopping modulation by the channel chopper unit to avoid the low-frequency noise of the amplifier, and amplified by the fully differential closed-loop amplifier to obtain reference voltage $V_{REF}$ and $V_{EEC}$ amplified multi-level chopping modulated EEG signals. The intra-channel chopping modulation frequency $f_c$ is 16 kHz.

S2: first-level inter-channel chopping modulation is performed on the intra-channel chopping modulated EEG signals in every two channels as a group to obtain first-level inter-channel chopping modulated EEG signals, wherein the frequency of first-level inter-channel chopping modulation is half of the intra-channel chopping modulation frequency, i.e. $f_c/2$; second-level inter-channel chopping modulation is performed on first-level inter-channel chopping modulated EEG signals in every two adjacent groups as a new big group by means of inter-channel chopping modulation control signals; and so on, wherein the chopping frequency of each level of inter-channel chopping modulation is reduced to half of the previous one, corresponding inter-channel chopping modulated EEG signals are output after each level of inter-channel chopping modulation, until the inter-channel chopping modulation of all channels is completed in the last level, and multi-level chopping modulated EEG signals are finally obtained. The inter-channel chopping modulation follows the principle of most adjacent channels taking the first modulation. The modulated groups follow the principle of most adjacent groups taking the first modulation for the next level of inter-channel chopping modulation. In the 16-channel EEG signal multi-channel acquisition system, a total of 16 channels of EEG signals from 1 to 16 are modulated. Inter-channel chopping modulation is performed in channel 1 and channel 2 as a first group, inter-channel chopping modulation is simultaneously performed in channel 3 and channel 4 as a second group, inter-channel chopping modulation is simultaneously performed in channel 5 and channel 6 as a third group, and so on. Therefore, in the 16-channel EEG signal multi-channel acquisition system, there are totally 8 groups of inter-channel chopping modulation. The circuit principle of inter-channel chopping modulation circuit is conversion of signal channels at two phases: for example, at phase 1, signal 1 is input to and output from channel 1, and at the same time signal 2 is input to and output from channel 2; at phase 2, signal 1 is input from channel 1 and output from channel 2, and at the same time signal 2 is input from channel 2 and output from channel 1; the phases 1 and 2 maintain a conversion of fixed frequency and have the same duration without overlapping each other. The frequency of first-level inter-channel chopping modulation is 8 kHz, which maintains the same amplitude and phase as the intra-channel chopping modulation control clock signal.

After adjacent channels form inter-channel chopping modulation groups, inter-channel chopping modulation is performed between the adjacent groups. Second-level inter-channel chopping modulation is performed on the first group consisting of signal 1 and signal 2 and the second group consisting of signal 3 and signal 4; meanwhile, the second-level inter-channel chopping modulation is also performed on the third group (signals 5 and 6) and the fourth group (signals 7 and 8), on the fifth group (signals 9 and 10) and the sixth group (signals 11 and 12), and on the seventh group (signals 13 and 14) and the eighth group (signals 15 and 16); the first group and second group in the second level will become the first group in the third-level inter-channel chopping modulation, the third group and fourth group in the second level will become the second group in the third level, the fifth group and sixth group in the second level will become the third group in the third level, the seventh group and eighth group in the second level will become the fourth group in the third level; then the third-level inter-channel chopping modulation is respectively performed between the first group and the second group in the third-level, and between the third group and the fourth group in the third-level; after that, the final inter-channel chopping modulation is performed and completed on new formed first group and new formed second group in the fourth level. The inter-channel chopping modulation aims to enable each signal to enter different channels at different phases to complete signal amplification, and to ensure that the number of modulation phases is the same as the number of channels. The expression of the inter-channel chopping modulation control signals $V_{gcN}(t)$ in time domain is:

$$V_{gcN}(t) = \frac{4}{\pi} \sum_{k=1,3,5\ldots}^{\infty} \frac{\sin\left(k\left(\frac{\omega_{gchop}}{2^{N-1}}\right)t\right)}{k} \quad (1)$$

where k is an odd number, which represents odd harmonics generated by the chopping modulation, $$\frac{\omega_{gchop}}{2^{N-1}}$$

is an angular frequency of the N-th-level inter-channel chopping modulation, and the expression $\omega_{gchop}$ of the angular frequency should be:

$$\omega_{gchop} = 2\pi f_{gchop} \quad (2)$$

where $f_{gchop}$ is the chopping frequency of first-level inter-channel chopping, $V_n(t)$ is the EEG signal of the n-th channel before the N-th-level inter-channel chopping modulation, and $V_m(t)$ is the EEG signal after the N-th-level inter-channel chopping modulation:

$$V_m(t) = V_N(t) \frac{4}{\pi} \sum_{k=1,3,5\ldots}^{\infty} \frac{\sin\left(k\left(\frac{\omega_{gchop}}{2^{N-1}}\right)t\right)}{k} \quad (3)$$

For multi-level inter-channel chopping modulation, from the perspective of a single channel, the expression of the inter-channel chopping modulation control signal is:

$$s(t) = \sum_{m=0}^{+\infty} \prod\left(\frac{t - mT - n\lambda}{\lambda} + \frac{1}{2}\right) \quad (4)$$

where T is a modulation period, f=1/T, f is a modulation frequency, that is, a chopping frequency of inter-channel chopping modulation, λ is a pulse width of the inter-channel chopping modulation control signal, λ=T/N, n represents the n-th channel, N represents the N-th-level inter-channel chopping modulation, Π(t) is a rectangular wave signal and its function is expressed as:

$$\Pi(t) = \begin{cases} 1, & \text{if } |t| < 0.5 \\ 0.5, & \text{if } |t| = 0.5 \\ 0, & \text{if } |t| > 0.5 \end{cases} \quad (5)$$

the frequency of the control clock signal of the second-level inter-channel chopping modulation is 4 kHz, the frequency of the control clock signal of the third-level inter-channel chopping modulation is 2 kHz, the frequency of the control clock signal of the fourth-level inter-channel chopping modulation is 1 kHz, and the control signal of each level of inter-channel chopping modulation maintains the same amplitude and phase.

S3: the multi-level chopping modulated EEG signals are amplified by the fully differential closed-loop amplifier in the signal flow direction of each channel, to obtain amplified multi-level chopping modulated EEG signals.

A precision instrumentation amplifier is designed in each channel, as shown in FIG. 3. The amplifier is designed to have a gain of 60 dB, and is a single-level closed-loop fully differential closed-loop amplifier, with an input capacitance of 20 pF and a feedback capacitance of 0.2 pF. The direct-current bias of the amplifier is provided by a pseudo resistor placed between the input and output ends of the amplifier. A decoupling input capacitor, with a magnitude of 300 nF, is configured in front of the input end of a hybrid chopper circuit, and is welded to the input end of an acquisition circuit. The decoupling input capacitors of 16 channels have unified parameters.

S4: inter-channel chopping demodulation is performed on the amplified multi-level chopping modulated EEG signals by means of the same architecture as step S2 but in an invert timing to obtain multi-level inter-channel chopping demodulated EEG signals, which pass through the intra-channel chopper demodulators to obtain intra-channel chopping demodulated EEG signals. For example, the signal acquired at the input end of channel I returns to the output end of channel 1, the signal acquired at the input end of channel 2 returns to the output end of channel 2, and so on. Finally the signals are demodulated to the original frequency by the intra-channel chopping demodulation.

The multi-level inter-channel chopping demodulated EEG signals are:

$$V_{demodN}(t) = \frac{\sum_{i=1}^{N} A_i}{N} v_i(t) \left[\prod_{m=1}^{N} v_{gcm}(t)\right]^2 = \frac{\sum_{i=1}^{N} A_i}{N} v_i(t) \prod_{m=1}^{N} H_m \quad (6)$$

where $A_i$ is the gain of the i-th channel, $V_{gem}(t)$ is an inter-channel chopping demodulation control signal, which is identical to the inter-channel chopping modulation control signal $V_{gcN}(t)$, and the harmonic parameter $H_m$ is:

$$H_m = \sum_{k=1,3,5...}^{\infty}\left(\frac{4}{k\pi}\right)\sin\left(k\left(\frac{\omega_{gchop}}{2^{m-1}}\right)t\right) * \sum_{p=1,3,5...}^{\infty}\left(\frac{4}{p\pi}\right)\sin\left(p\left(\frac{\omega_{gchop}}{2^{m-1}}\right)t\right) \quad (7)$$

where k and p are odd numbers, and m represents the m-th level of N levels of inter-channel chopping demodulation. The frequency of the first-level inter-channel chopping demodulation control signal is 1 kHz, the frequency of the second-level inter-channel chopping demodulation control signal is 2 kHz, the frequency of the third-level inter-channel chopping demodulation control signal is 4 kHz, the frequency of the fourth-level inter-channel chopping demodulation control signal is 8 kHz, and each level of inter-channel chopping demodulation control signal maintains the same amplitude and phase as its inter-channel chopping modulation control signal. After four levels of inter-channel chopping demodulation, the signal of each channel returns to the output end of each channel and then passes through the intra-channel chopper demodulator, and the signal carried to the chopping frequency returns to its original frequency band. Intra-channel chopping modulation control signals and intra-channel chopping demodulation control signals are synchronous signals, that is, the intra-channel chopping modulation and intra-channel chopping demodulation processes in each of 16 channels are controlled by the same clock signal generated by an external crystal oscillator, where the chopping frequency is 16 kHz.

The multi-level inter-channel chopping modulation control signals and intra-channel chopping modulation control signals are generated by the same clock signal, and different clock rising edges or falling edges are maintained, wherein the difference between the rising edges or falling edges of different control signals is greater than or equal to 20 ps, and the crosstalk between channels is less than or equal to −70 dB.

S5: the intra-channel chopping demodulated EEG signals are transmitted to the low-pass filter in the signal flow direction of each channel, and high-frequency modulation noise is filtered out by the low-pass filter to retain the signal content of the original EEG signals.

The signals after the intra-channel chopping demodulation and inter-channel chopping demodulation contain harmonic noise of carrier modulation signals. Various types of noise are filtered out by the low-pass filter connected to the output end of each channel, and only the acquired EEG signals are left. The low-pass filter has a cut-off frequency of 200 Hz and implements filtering by means of a switching capacitor, which has an operating frequency of 32 kHz. The complete process of intra-channel chopping modulation, multi-level inter-channel chopping modulation, amplification, multi-level inter-channel chopping demodulation, intra-channel chopping demodulation, and low-pass filtering, is regarded as a complete hybrid chopping process.

The amplification gain of 16 channels in the EEG acquisition system is $A_i$, and the equivalent amplification gain of each channel after the hybrid chopping technology is $A_{gi}$, where i represents the i-th channel. Therefore the equivalent amplification gain of each channel after the hybrid chopping technology is:

$$A_{gi} = \frac{1}{16}\sum_{k=1,2,3...}^{16} A_i \quad (8)$$

Through the above steps, the technical method realizes dynamic balance of 16-channel acquisition gains, eliminates gain errors between channels, ensures signal acquisition accuracy, and avoids flicker noise in amplifiers.

Described above are merely preferred embodiments of the present application, and the present application is not limited thereto. Various modifications and variations may be made to the present application for those skilled in the art. Any modification, equivalent substitution, improvement, etc. made within the spirit and principle of the present application shall fall into the protection scope of the present application.

The invention claimed is:

1. A method for eliminating multi-channel gain errors of an EEG signal acquisition system, wherein the multi-channel acquisition system comprises an acquisition electrode, decoupling input capacitors, input units, intra-channel chopper modulators, inter-channel chopper modulators, fully differential closed-loop amplifiers, inter-channel chopper demodulators, intra-channel chopper demodulators, low-pass filters and an output unit sequentially arranged in a signal flow direction of channels, and the method comprises the following steps:

S1: acquiring EEG signals by the acquisition electrode, transmitting the acquired EEG signals to the input units by the decoupling input capacitors, and inputting, by each input unit, the acquired EEG signal into the intra-channel chopper modulator to obtain an intra-channel chopping modulated EEG signal and an intra-channel chopping modulation frequency;

S2: performing first-level inter-channel chopping modulation on the intra-channel chopping modulated EEG signals in every two channels as a group to obtain the first-level inter-channel chopping modulated EEG signals, wherein the frequency of first-level inter-channel chopping modulation is half of the intra-channel chopping modulation frequency; performing second-level inter-channel chopping modulation on the first-level inter-channel chopping modulated EEG signals in every two adjacent groups as a new big group by means of inter-channel chopping modulation control signals; and so on, wherein the chopping frequency of each level of inter-channel chopping modulation is reduced to half of the previous one, corresponding inter-channel chopping modulated EEG signals are output after each level of inter-channel chopping modulation, until the inter-channel chopping modulation of all channels is completed in the last level, and multi-level chopping modulated EEG signals are finally obtained;

S3: amplifying the multi-level chopping modulated EEG signals by the fully differential closed-loop amplifier in the signal flow direction of each channel, to obtain amplified multi-level chopping modulated EEG signals;

S4: performing inter-channel chopping demodulation on the amplified multi-level chopping modulated EEG signals by means of the same architecture as step S2 but in an invert timing to obtain multi-level inter-channel chopping demodulated EEG signals, which pass through the intra-channel chopper demodulators to obtain intra-channel chopping demodulated EEG signals; and S5: transmitting the intra-channel chopping demodulated EEG signals to the low-pass filter in the signal flow direction of each channel, and filtering high-frequency modulation noise out by the low-pass filter to retain the signal content of the original EEG signals.

2. The method for eliminating multi-channel gain errors of the EEG signal acquisition system according to claim 1, wherein the acquisition electrode comprises a working electrode and a reference electrode, a positive terminal of each channel is connected to the reference electrode to acquire an EEG signal of a reference EEG reference voltage $V_{REF}$, a negative terminal is connected to the working electrode to acquire an EEG signal of a working EEG reference voltage $V_{EEC}$, and the EEG signals of the positive terminal and the negative terminal are subjected to chopping modulation by the intra-channel chopper modulators and the inter-channel chopper modulators, and amplified by the fully differential closed-loop amplifier to obtain amplified multi-level chopping modulated EEG signals.

3. The method for eliminating multi-channel gain errors of the EEG signal acquisition system according to claim 1, wherein in step S2, the expression of the inter-channel chopping modulation control signals $V_{gcN}(t)$ in time domain is:

$$V_{gcN}(t) = \frac{4}{\pi} \sum_{k=1,3,5...}^{\infty} \frac{\sin\left(k\left(\frac{\omega_{gchop}}{2^{N-1}}\right)t\right)}{k},$$

where k is an odd number, which represents odd harmonics generated by the chopping modulation, $\omega_{gchop}/2^{N-1}$ is an angular frequency of the N-th-level inter-channel chopping modulation, $\omega_{gchop}=2\pi f_{gchop}$, and $f_{gchop}$ is the chopping frequency of the first-level inter-channel chopping modulation, $$V_m(t) = V_N(t) \frac{4}{\pi} \sum_{k=1,3,5...}^{\infty} \frac{\sin\left(k\left(\frac{\omega_{gchop}}{2^{N-1}}\right)t\right)}{k},$$

where $V_n(t)$ is the EEG signal of the n-th channel before the N-th-level inter-channel chopping modulation, and $V_m(t)$ is the EEG signal after the N-th-level inter-channel chopping modulation, for multi-level inter-channel chopping modulation, from the perspective of a single channel, the expression of the inter-channel chopping modulation control signal is:

$$s(t) = \sum_{n=0}^{+\infty} \prod\left(\frac{t - mT - n\lambda}{\lambda} + \frac{1}{2}\right),$$

where T is a modulation period, f=1/T, f is a modulation frequency, that is, a chopping frequency of inter-channel chopping modulation, $\lambda$ is a pulse width of the inter-channel chopping modulation control signal, $\lambda$=T/N, n represents the n-th channel, N represents the N-th-level inter-channel chopping modulation, $\Pi(t)$ is a rectangular wave signal and its function is expressed as:

$$\Pi(t) = \begin{cases} 1, & \text{if } |t| < 0.5 \\ 0.5, & \text{if } |t| = 0.5 \\ 0, & \text{if } |t| > 0.5 \end{cases},$$

the inter-channel chopping modulation control signal of each level maintains the same amplitude and phase.

4. The method for eliminating multi-channel gain errors of the EEG signal acquisition system according to claim 3, wherein the multi-level inter-channel chopping demodulated EEG signals in step S4 are:

$$V_{demodN}(t) = \frac{\sum_{i=1}^{N} A_i}{N} v_i(t) \left[\prod_{m=1}^{N} v_{gcm}(t)\right]^2 = \frac{\sum_{i=1}^{N} A_i}{N} v_i(t) \prod_{m=1}^{N} H_m,$$

where $A_i$ is the gain of the i-th channel, $V_{gem}(t)$ is an inter-channel chopping demodulation control signal, which is identical to the inter-channel chopping modulation control signal $V_{gcN}(t)$, and the harmonic parameter $H_m$ is:

$$H_m = \sum_{k=1,3,5...}^{\infty} \left(\frac{4}{k\pi}\right) \sin\left(k\left(\frac{\omega_{gchop}}{2^{m-1}}\right)t\right) * \sum_{p=1,3,5...}^{\infty} \left(\frac{4}{p\pi}\right) \sin\left(p\left(\frac{\omega_{gchop}}{2^{m-1}}\right)t\right),$$

where k and p are odd numbers, and m represents the m-th level of N levels of inter-channel chopping demodulation.

5. The method for eliminating multi-channel gain errors of the EEG signal acquisition system according to claim 4, wherein the equivalent amplification gain of each channel is:

$$A_{gi} = 1/i\Sigma_{i=1,2,3}{}^i \cdots A_i,$$

where $A_i$ is the gain of the i-th channel, i is greater than or equal to 2, and I is the N-th power of 2.

6. The method for eliminating multi-channel gain errors of the EEG signal acquisition system according to claim 1, wherein regarding the inter-channel chopping demodulation in step S4, after the N levels of inter-channel chopping demodulation, the signal of each channel returns to the output end of each channel and then passes through the intra-channel chopper demodulator, the signal carried to the chopping frequency returns to its original frequency band; intra-channel chopping modulation control signals and intra-channel chopping demodulation control signals are synchronous signals, that is, the intra-channel chopping modulation and intra-channel chopping demodulation processes in each channel are controlled by the same clock signal generated by an external crystal oscillator.

7. The method for eliminating multi-channel gain errors of the EEG signal acquisition system according to claim 1, wherein the low-pass filter has a cut-off frequency of 200 Hz and implements filtering by means of a switching capacitor, which has an operating frequency of 32 kHz.

8. The method for eliminating multi-channel gain errors of the EEG signal acquisition system according to claim 1, further comprising non-overlapping setting of rising edges or falling edges of the control signals: the multi-level inter-channel chopping modulation control signals and intra-channel chopping modulation control signals are generated by the same clock signal, and different clock rising edges or falling edges are maintained, wherein the difference between the rising edges or falling edges of different control signals is greater than or equal to 20 ps, and the crosstalk between channels is less than or equal to −70 dB.

9. The method for eliminating multi-channel gain errors of the EEG signal acquisition system according to claim 1, wherein the fully differential closed-loop amplifier has a gain of 60 dB, an input capacitance of 20 pF, and a feedback capacitance of 0.2 pF.

10. The method for eliminating multi-channel gain errors of the EEG signal acquisition system according to claim 1, wherein the magnitude of the decoupling input capacitor is 300 nF.

\* \* \* \* \*